March 9, 1965 A. SCHREIBER 3,172,849
APPARATUS FOR IMPROVING THE COMBINED MECHANICAL AND BIOLOGICAL
CLARIFICATION OF TOWN SEWAGE OR THE LIKE
Original Filed Oct. 17, 1956 2 Sheets-Sheet 2

I-II

III-IV-V

III-IV-VI

INVENTOR.
BY August Schreiber
Tourover and Browdy
ATTORNEYS

United States Patent Office 3,172,849
Patented Mar. 9, 1965

3,172,849
APPARATUS FOR IMPROVING THE COMBINED MECHANICAL AND BIOLOGICAL CLARIFICATION OF TOWN SEWAGE OR THE LIKE
August Schreiber, Bahnhofstrasse 45A, Hannover-Vinnhorst, Germany
Original application Oct. 17, 1956, Ser. No. 616,405, now Patent No. 2,963,430, dated Dec. 6, 1960. Divided and this application Nov. 29, 1960, Ser. No. 72,367
2 Claims. (Cl. 210—151)

This application is a division of my application Serial No. 616,405, filed October 17, 1956, having matured into United States Letters Patent No. 2,963,430 on December 6, 1960.

The invention relates to a plant for the mechanical-biological purification of town sewage or the like in several successive stages. For the sake of brevity, the material treated will be referred to in the following specification and claims as "sewage," but it is to be clearly understood that the term covers various impure materials—waste liquids or semi-liquids—of the type that are adapted to be treated in accordance with the present invention.

It is already known to first free the solid materials contained in the sewage by sedimentation or a similar mechanical treatment—which treatment will hereinafter be referred to as "mechanical purification"—and, thereafter, the organic impurities (contaminants) dissolved in the sewage are decomposed by the activity of microorganisms in the presence of oxygen (air)—if necessary, with the formation of settable solids; this last method of treatment will hereafter be designated "biological purification."

For the mechanical purification there are used settling (clarification) and other vessels, in which the flow of the sewage is reduced to such an extent that the solids are separated out by sedimentation or accumulation at the surface of the water. The separated sludge is converted in separate vessels or chambers by a digestion process into a practically odorless residue.

For the biological purification, there are frequently used the so-called trickling filters, that is to say, chambers that are loaded with a filler material, and the sewage is distributed thereabove so that it flows in thin layers over the filler material, while air flows simultaneously upwards through the filler in the chamber.

Such trickling filter installations are usually very expensive to manufacture. It is true that there exist less expensive trickling filters that can be loaded to a high degree; however, only a partial purification is achieved in these last mentioned trickling filters.

An important object of the invention consists in improving the mechanical purification and, especially, the biological purification action which latter is carried out in trickling filters, so that such installations can be erected at substantially lower cost, the purification operated more effectively, and the nuisance due to odor and appearance reduced.

According to the present invention, this result is obtained in that the preliminary mechanical purification, consisting of coarse and fine purification stages, the pump sump and the final clarifier, comprise several chambers formed by separation walls in a preferably cylindrical vessel, and that the biological purification (stage) comprises a trickling filter the walls of which—with the intermediary of a roof—form an upward extension of the walls of the mechanical purification system.

Further objects and features of the invention will be apparent from the following description, which is illustrated in the attached drawings, in which FIGURE 1 is a horizontal section through a combined mechanical and biological purification plant for sewage in accordance with the invention, essentially diagrammatic and illustrating by direction arrows fluid-flow paths and by dotted lines fluid-conduits;

FIGURE 5 is a vertical section through a portion of the plant illustrated in FIGURE 1, taken along line VIII—IV of FIGURE 1;

FIGURE 6 is a vertical section, along line VII—IV—VI of FIGURE 1 of the trickling filter for the biological purification arranged in the upper part of the plant according to FIGURE 1.

Figure 1:
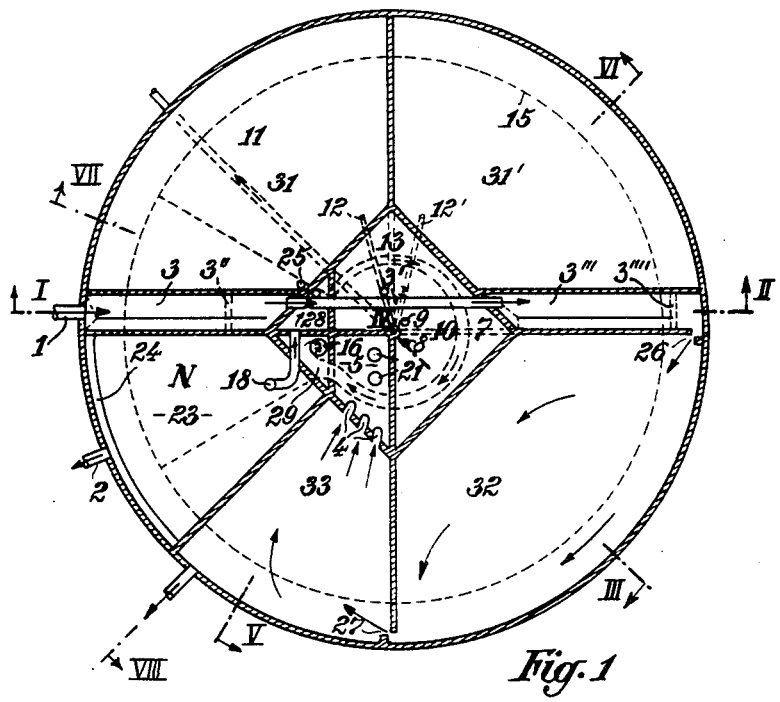
Figure 2:
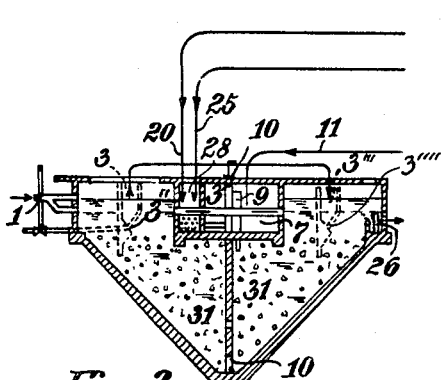
FIGURE 2 is a vertical section through the lower portion of the plant taken along the line I—II of FIGURE 1 showing by phantom lines the general cross sectional appearance of the Imhoff troughs of the plant.
Figure 3:
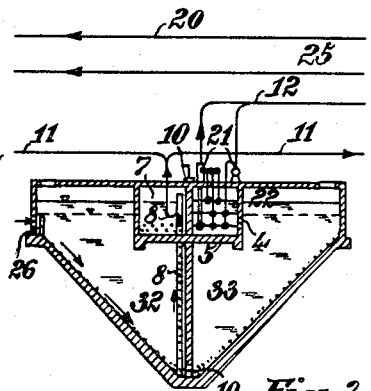
FIGURE 3 is a vertical section taken along line III—IV—V of FIGURE 1.
Figure 4:
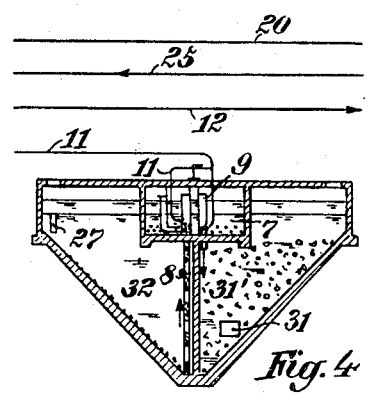
FIGURE 4 is a vertical section taken along the line III—IV—VI of FIGURE 1.

The combined mechanical and biological purification using trickling filters can, according to the present invention, be carried out satisfactorily in a closed structure, as illustrated in FIGURES 1–6.

The preliminary mechanical purification, consisting of coarse and fine purification stages, the pump sump and the final clarifier preferably comprise several chambers, which are formed by partitions in a substantially cylindrical vessel. The biological purification comprises a trickling filter the walls of which form an upward extension of the walls of the mechanical purification devices. The purification of the sewage with throttling of the flow of the stream of sewage can be carried out in such a manner that, by periodic damming of the sewage, the sludge is moved from the segmental settling chamber or chambers of the mechanical fine purification stage into one or more chambers of the coarse purification stage, and that an irregular supply of sewage is equalized by damming up the sewage in the mechanical purification stage, so that the sewage is uniformly supplied to the adjoining biological section, and the sludge formed in the biological purification stage is separated out in a final clarifier and, with the sludge from the fine mechanical purification stage, is supplied into the digestion spaces of the coarse mechanical purification stage.

In contrast to the known sewage purifying plants, in which there are provided separate structures for the mechanical purification, for the pumping assembly, for the biological trickling filters and for the final clarifier, all the clarifying chambers and the pump assembly are, according to the invention, arranged in a single chamber. Adjustable return devices for the sewage and sludge move the sludge from the biological purification stage into the mechanical purification stage and from there into the sludge digestion chamber disposed at the inlet. The compact, circular construction saves building material and connecting pipes and only takes up a small amount of space. The automatic operation can be adjusted to the purification requirements as conditioned by the amount and concentration of the sewage. Apart from the necessary elimination of sludge, the plant requires practically no attention, aside from the usual supervision.

The sewage flowing in at 1 into the sewage treatment plant shown in FIGURES 1 to 6, is initially purified mechancially in four chambers 31, 31', 32, 33 and then passes into the section or compartment 5 from which the sewage is removed periodically or continuously by means of pumps in such a manner, that the accumulation of sewage obtained in one day is conveyed uniformly during the entire 24 hours of the day to the biological purifying plant (trickling filter, FIG. 6) by means of periodically operated pumps. Fluctuations in the supply of sewage are compensated for by raising or lowering the water level in the chambers 31, 31', 32, 33. During the main flow (influent) period by day, the water level is therefore raised, while it falls again with the smaller supply by night. In this way, the same water level is always reached after 24 hours. As a result of the daily rise and fall of the water level, the sludge is moved from the settling chambers 32, 33 into the sludge-storage and digestion chambers 31, 31'. The sludge from the final clarifier 23 also passes into the sludge digestion chambers 31, 31'. Therefore, all the sludge, i.e. both the sludge suspended in the (initial) raw water as well as the sludge formed in the biological trickling filter, is returned counter to the general direction of flow of the sewage into the digestion and storage chambers 31, 31' disposed at the inlet.

For the initial mechanical purification, the sewage flows through the supply pipe 1 into the first so-called Imhoff settling trough 3, which is arranged above the first chamber 31 of the mechanical plant. The inlet is so designed that a horizontally directed inflow into the trough is assured even with different water levels and discharge of the water through the sludge slot 3'' of the Imhoff trough 3 into the digestion chamber 31 is largely avoided. The sewage then passes through the connecting pipe 3' into a second Imhoff trough 3''' arranged above the second chamber 31' also having a sludge slot 3''''. In the Imhoff troughs, the large floating and submerged substances are separated out from the waste water or sewage, and eddying of the sludge in the digestion chamber 31 disposed therebeneath is avoided. All the sludge from the entire installation is eventually accumulated in the two chambers 31 and 31' and is digested; it is removed at short time intervals for further treatment.

From the Imhoff trough 3''', the sewage flows through a vertical narrow slot 26 to the chamber 32 and then to the chamber 33, which is likewise connected to chamber 32 by a vertical slot 27. The finer sludge particles are separated out in the chambers 32 and 33. The said particles travel from the base of the chambers 32 and 33 through the pipe 8 provided with a non-return flap valve into the section 7 and from the latter through a pipe 9 into the chamber 31'; see FIGS. 3 and 4.

By means of the narrow vertical slots, there is obtained a substantially uniform horizontal flow of the water in the chambers and the settling of the sludge particles. The settling operations are not influenced by changes in the water level. The subdivision into a plurality of settling chambers prevents bulky constituents floating in the sewage from reaching the pumps and interfering with the operation thereof.

From the chamber 33, the sewage passes into the section 5 by way of the pipes 4, the inlet openings of which are below the water level. The water level in the chambers 31, 31', 32 and 33 and in the section 5 is substantially the same. From the section 5, the sewage is forced by the pumps 21 into the rotating distributor 19 (FIG. 6) and is uniformly distributed by the latter on top of the biological trickling filter 14, which is arranged above the chambers 31 and 23 and has an operating (service) space 17. That part of the trickling filter 14 which is disposed above the operating space 17 has a smaller height and a correspondingly smaller purifying action. The water from this shallower portion of the trickling filter is consequently collected on the top of the operating chamber 17 and flows through a pipe line 25 to a compartment 28. From the latter the partially purified sewage flows through the connecting pipe 3', the Imhoff trough 3''' and the slot 26 to the chamber 32. The purified sewage from the remaining part of the trickling filter 14 flows to a collecting trough 13 and passes by way of a descending pipe into the chamber 23.

In order to maintain best possible biological conditions in the trickling filter 14, and in order to flush out the sludge, there is provided between the chamber 23 and the section 5, a pipe which can be shut off. If the trickling filter is to be flushed with both pumps, a suitable slide valve is opened and the trickling filter is only supplied with water which has been purified biologically and freed from sludge in the final clarifier 23.

For the final mechanical purification, the final clarifier 23 is formed at its center with a depression into which the sludge formed in the settling filter 14 is adapted to drop owing to its greater weight. The effluent rises in the final clarifier 23 and flows over a sill 24 into a collecting trough, and discharges from the installation by way of the discharge pipe 2 and can be released into a river course; see FIG. 1.

On starting operation, granular rubbings material (grindings) and reaction product are flushed out of the trickling filter filling (packing) 14. In order to prevent interruptions in the operations due to this granular material, the sewage coming from the trickling filter 14 has the sand removed therefrom before it flows to the final clarifying chamber 23. This is effected by conducting the waste water from the collecting trough 13 to a clarifying chamber 29. The sewage is introduced into the latter up to about half the height of the clarifying chamber, so that it must rise still further before it can pass through the discharge pipe 16 into the bottom recess in the final clarifying chamber 23. As it flows through the chamber 29, all the sandy constituents are deposited. The mixture of sewage and sludge from the final clarifying chamber is supplied to the chamber 28 in order to have the sand removed therefrom, following which it is again conveyed into the connecting pipe 3' through an opening therein. The discharge from the shallower portion of the trickling filter also has sand removed therefrom in the chamber 28.

For the return of the sludge, the sewage purified in the trickling filter 14, to the extent that it is not able to be discharged from the tank 23 by way of the sill 24, is conducted through the device 18—together with the sludge accumulating in the depression of the final clarifying chamber 23—by way of the compartment 28, the connecting pipe 3' and the Imhoff trough 3''' into the chambers 32, 33. The sill 24, the overflow of the device 18 and the quantity delivered by the pumps 21 are so adjusted, that only about a 24th of the daily sewage discharges every hour by way of the sill 24. The remainder of the biologically purified sewage and the sludge formed in the final clarifier 23 are conducted by way of the connecting pipe 20 and the Imhoff trough 3''' into the chamber 31' and the chambers 32, 33. By this means, the sewage from the mechanical purifying devices is diluted, sludging of the trickling filter 14 is avoided and high loading of the biological trickling filter is rendered possible. Furthermore, the sludge from the final clarifying chamber 23 is constantly supplied to the mechanical purification section.

In order that not too much of the sewage which has already been purified biologically comes into contact with digested sludge, the sludge resulting from the purifying chambers 32, 33 is returned through the sludge pipes 8, 9 and the sludge section 7 into the chamber 31' when there is a change in the water level. With increasing water level, the sludge is forced through the pipe 8 from the bottom of the chambers 32 and 33 into the section 7. The riser pipe 8 is provided in the section 7 with a non-return flap or valve. Leading from the section 7 is a down pipe 9 leading to the upper portion of the chamber 31'. In the section 7, this pipe 9 is also provided with a non-return flap or valve. When the water level drops, the sludge therefore flows from the section 7 by way of the pipe line 9 to the chamber 31'. If the surface of the section 7 be given sufficiently large dimensions, and if the difference between the highest and lowest water levels be sufficiently large, then all the sludge forming in the chambers 32 and 33 will be moved into the chamber 31'.

A manual pump or other pumping arrangement (not shown) is preferably provided in order that the sludge can if necessary be moved into the chamber 31' in event of a stoppage in flow. It is also advantageous to install a water jet or mammoth pump on the sludge riser pipe 8, thus making it possible by means of such pumps to determine whether there is an accumulation of sludge on the bottom of the chamber 32 and to remove the same.

The two pumps of the pump installation have equal pumping capacities, each capacity being that required to supply the trickling filter with about 0.8 m.³ per square metre of surface per hour. One pump insures the normal operation (service), the other acts as a standby. By means of electrically driven clockwork provided with an adjustable rotary scale, the operating (service) pump can be set into operation for 1–10 minutes and stopped for 1–10 minutes. The selected time intervals follow each other uninterruptedly. Each pump can be selectively connected to the automatic time switch device, whereby the second pump becomes the standby. Only one pump is ever, i.e. at any given time, connected to the timing device and kept in continuous service.

When the water level in the chambers 32 and 33 drops to its lowest level, determined by the upper edge of the pipe bend 4 disposed in the compartment 5, the supply to the compartment 5, from which the pumps draw liquid, is shut off. The operating (service) pump continues to work, however, and empties the compartment 5 until the pump is switched off by means of a float member (not shown). If the water level in the compartment 5 rises to the upper edge of the pipe bend 4, then the operating pump is automatically switched on again.

Since the compartment 5 is small in relation to the settling chambers 32 and 33, the trickling filter 14 is always charged for a short period with sewage in the event that, for example, in the hours of the morning, the sewage has been almost completely pumped out of the installation and the flow to the clarifying plant is but quite small. Due to this continuous operation, good biological conditions are produced and, in addition, the danger of freezing is eliminated.

When the water level in the chambers 32, 33 and the compartment 5 reaches a predetermined level, the reserve pump is switched on by a float. This pump then runs continuously until the water level in the compartment 5 and the chamers 32, 33 has dropped by about 2 to 3 centimetres. However, the operating (service) pump is also continuing to operate during this period. During this time, the trickling filter 14 is additionally charged with 0.8 cubic metre for each square metre of its surface and per hour. This operating condition provides a loading of 6 to 8 cubic metres of sewage for each cubic metre of filling in the trickling filter 14, based on 24 hours per day.

In the case of a breakdown of the electric timing device, then the entire (sewage) clarification plant can be changed over to the level control provided for the sump pump under the bent pipes. Under these circumstances, there are only attained those biological conditions as are obtained in other clarification plants employing the usual level control devices.

The fact that the amounts of sewage are not always entirely constant on different days can be compensated for at will either by switching off for a short period the operating (service) pump when the lowest water level is reached, or by switching on for a short period the reserve pump when the highest water level is reached.

For the removal of sludge, there is fitted a pipe at the point of intersection of the partitions, that is to say, substantially on the central axis of the installation. Fitted into the lowermost part of the sludge-removing pipe is a rotary slide valve. It is actuated by a sliding rod extending into the central shaft of the trickling filter 14. At the top end, this pipe is sealed relative to the riser pipe by means of a flange and stuffing box and is provided with a rotatable lever.

If the sludge which has settled in the chamber 31 is circulated by pumping about once every week, then the sludge digestion is considerably accelerated and settlement of sand is avoided; raking and sand collection can consequently be dispensed with in many cases.

For circulating the sludge, there are provided two branches 12 and 12' on the sludge riser pipe 10, said branches being adapted to be shut off. Should it be desired to circulate sludge of the chamber 31, then the other sludge draw-off lines 11 and 12' are closed and the branch 12 is maintained open. By blowing in air at the lower end of the sludge riser pipe, the sludge is sucked out from the pointed (conical) end of the chamber 31 and is pumped over the surface of 31. In this manner, not only is the sludge circulated but, in addition, the stream destroys any layer of sludge which tends to be formed. In the same manner, there can be carried out circulation of sludge in the chamber 31' with the sludge branch 12'.

The sludge removal pipe, extending as far as the lowest point of the bottom of the chambers 31 and 31', opens by means of a branch—which is adapted to be closed—below the water level into a sludge-removing shaft (pit) or sludge drying bed provided outside the illustrated installation. On being pumped from the sludge-removal pit, the sludge from the chambers 31, 31' of the initial purifying section flows automatically into the pit. If the sludge-drying beds are disposed at a higher level than the water level of the initial purification section, or if the sludge is to be pumped into a sludge discharge truck disposed at a higher level, then this can likewise be effected by means of a pump or by means of compressed air.

The small round structure, which is advantageously built up of shaped concerete bricks and which contains the installation according to FIGURES 1 to 6, is inconspicuous and closed. This arrangement and also the movement of the sludge prevents odors being produced. The sewage clarifying plant can consequently be erected in the vicinity of houses, and owing to the fact that it takes a small amount of space, it can also be erected on ground adjacent industrial and commercial buildings.

The sewage purification plant illustrated in FIGS. 1–6 can, under certain circumstances, be operated advantageously as follows:

The mixture of sewage and sludge enriched with air coming from the trickling filter 14, is removed from the depression in chamber 23 and conveyed directly into the compartment 5. There is additionally passed into the compartment 5 the mechanically pre-purified sewage from the chambers 32, 33 and the partially purified discharge from the shallower trickling filter above the service space. The liquid mixture is then conveyed from the compartment 5 of the trickling filter 14. The ratio of the quantity of the mechanically pre-purified sewage to the quantity of sewage mixed therewith from the trickling filter 14, and the aeration of the water in the trickling filter 14, are so chosen that a polysaprobic sludge which smears or soils the surface of the packing (filling) in the trickling filter is not formed in the latter, but a mesosaprobic sludge that can be readily flushed out, namely, during the periodic loading (charging) of the trickling filter 14.

A portion of the sewage removed from the trickling filter 14 flows out—without sludge—from the chamber over the sill 24, the remainder of the water and the sludge pass into the compartment 5, and there mix with the raw sewage that has only been pre-purified mechanically. A portion of the sludge from the outlet of the trickling filter 14 is removed continuously or intermittently and conveyed as excess sludge into the chamber 31, in order to prevent the sludge concentration in the circulating sewage from increasing to an unpermissible degree.

However, it is also possible to regulate the quantity of the sludge in circulation by the operation of the pumps. That is, if the pumps be operated less frequently, then, there pass from the compartment 5 into the chamber 33 a portion of the influent sewage from the shallower section of the trickling filter 14 and a portion of the concentrated sludge-sewage mixture from the depression of the final clarifier chamber 23. It is true that when the pumps are operated, this sludge-sewage mixture is also sucked in, but meanwhile a portion of this sludge has sunk and, thereupon, passes by way of the depressions in the chambers 32, 33 and the sludge recycle line, into the sludge compartments of the chambers 31, 31'.

The mode of operation of the purification plant last described is practically a purification process, which is designated in the sewage treating art as "an activated sludge process," but in which the aeration tanks are replaced by the trickling filters.

I claim:

1. In a sewage treatment plant for mechanical and biological purification of raw sewage influent comprising in combination: a cylindrical vessel having a conically-shaped bottom, said vessel including a plurality of vertically-disposed, radially-extending partitions extending from the inner surface of said bottom and dividing said conically-shaped vessel into a plurality of separate lower compartments each having a sector-shaped cross section, at least one of said compartments comprising a sludge digestion chamber for receiving relatively coarse sewage material, a pair of said compartments comprising first and second settling chambers for receiving sewage influent having relatively finer sludge particles to be mechanically separated therein, sewage influent introducing means for directing raw sewage influent into said vessel, said sewage influent introducing means including means in said vessel communicating with said sludge digestion chamber and being constructed and arranged to discharge relatively coarse sewage material into said sludge digestion chamber, said sewage influent introducing means including an outlet adjacent to the outer wall of said vessel and communicating with said first settling chamber and being constructed and arranged to discharge relatively finer sewage influent into said first settling chamber, one of said partitions between said pair of compartments having means adjacent to a free edge portion thereof to provide fluid communication between said pair of compartments, said vessel including still another compartment separated from those mentioned and comprising an effluent receiving compartment and including a discharge portion for directing purified fluids away from said vessel, said vessel including an upper, mechanically-purified-influent-receiving compartment disposed above the compartments defined by said partitions, the second of said pair of compartments including an upper discharge portion for directing mechanically purified influent into said last mentioned compartment, trickling filter means above said compartments and overlying said still another compartment and having a lower discharge portion, means including pump means in said mechanically-purified-influent-receiving compartment to convey a mechanically purified fluid from said last mentioned compartment to the upper portion of said trickling filter, means connected to said lower discharge portion and said effluent receiving compartment to convey biologically purified effluent from the lower portion of said trickling filter to said effluent receiving compartment, means in said vessel connected to a lower portion of said effluent receiving compartment for recirculating biologically purified effluent and residue into the sewage influent introducing means, and means for discharging sludge from said sludge digestion chamber.

2. The structure as claimed in claim 1 in which said vessel includes yet another compartment defined by said partitions for also receiving relatively coarse sewage material from said sewage influent introducing means.

References Cited by the Examiner
UNITED STATES PATENTS

| | | | |
|---|---|---|---|
| 978,889 | 12/10 | Imhoff | 210—151 X |
| 2,090,405 | 8/37 | Shook | 210—251 X |
| 2,097,779 | 11/37 | Shook | 210—258 X |
| 2,141,979 | 12/38 | Halvorson et al. | 210—17 |
| 2,283,166 | 5/42 | Buell et al. | 210—17 |
| 2,340,848 | 2/44 | Reybold et al. | 210—195 X |
| 2,355,640 | 8/44 | Fischer et al. | 210—151 |
| 2,355,760 | 8/44 | Trebler | 210—151 X |
| 2,553,228 | 5/51 | Yonner | 210—151 |
| 2,694,043 | 11/54 | Jenks | 210—151 |

REUBEN FRIEDMAN, *Primary Examiner.*

HERBERT L. MARTIN, *Examiner.*